US012039429B2

(12) United States Patent
Wang

(10) Patent No.: US 12,039,429 B2
(45) Date of Patent: Jul. 16, 2024

(54) METHOD AND SYSTEM FOR ACCELERATING EQUILIBRIUM COMPUTATION ON SPARSE RECURRENT NEURAL NETWORK

(71) Applicant: NANJING PROCHIP ELECTRONIC TECHNOLOGY CO., LTD, Nanjing (CN)

(72) Inventor: Zhen Wang, Nanjing (CN)

(73) Assignee: NANJING PROCHIP ELECTRONIC TECHNOLOGY CO., LTD, Nanjing (CN)

( * ) Notice: Subject to any disclaimer, the term of this patent is extended or adjusted under 35 U.S.C. 154(b) by 0 days.

(21) Appl. No.: 18/033,069

(22) PCT Filed: Oct. 29, 2020

(86) PCT No.: PCT/CN2020/124656
§ 371 (c)(1),
(2) Date: Apr. 21, 2023

(87) PCT Pub. No.: WO2022/082836
PCT Pub. Date: Apr. 28, 2022

(65) Prior Publication Data
US 2023/0394279 A1 Dec. 7, 2023

(30) Foreign Application Priority Data

Oct. 22, 2020 (CN) .......................... 202011137315.2

(51) Int. Cl.
*G06N 3/044* (2023.01)
*G06F 9/50* (2006.01)
(52) U.S. Cl.
CPC ........... *G06N 3/044* (2023.01); *G06F 9/5094* (2013.01)

(58) Field of Classification Search
CPC .............................. G06N 3/044; G06F 9/5094
See application file for complete search history.

(56) References Cited

U.S. PATENT DOCUMENTS

2018/0046895 A1 2/2018 Xie et al.
2018/0189234 A1 7/2018 Nurvitadhi et al.
(Continued)

FOREIGN PATENT DOCUMENTS

CN 110069444 A 7/2019
CN 111026700 A 4/2020
(Continued)

OTHER PUBLICATIONS

Clark, Mark A. Dynamic Voltage/Frequency Scaling and Power-Gating of Network-on-Chip with Machine Learning. Diss. Ohio University (Year: 2019).*

(Continued)

*Primary Examiner* — Michael J Huntley
*Assistant Examiner* — Adam C Standke
(74) *Attorney, Agent, or Firm* — Bayramoglu Law Offices LLC

(57) ABSTRACT

An equilibrium computation acceleration method and system for a sparse recurrent neural network determine scheduling information based on an arbitration result of sparsity of a weight matrix, select a computation submodule having operating voltage and operating frequency that match the scheduling information or a computation submodule having operating voltage and operating frequency that are adjusted to match the scheduling information, and use the selected computation submodule to perform a zero-hop operation and a multiply-add operation in sequence, to accelerate equilibrium computation. The equilibrium computation acceleration system includes a data transmission module, an equilibrium computation scheduling module with a plurality of (Continued)

independent built-in computation submodules, and a voltage-adjustable equilibrium computation module. An error monitor is configured to achieve dynamic voltage adjustment. The data transmission module quickly exchanges a configuration of a read/write memory to reduce additional data transmission.

17 Claims, 7 Drawing Sheets

(56) References Cited

U.S. PATENT DOCUMENTS

| | | |
|---|---|---|
| 2019/0205358 A1 | 7/2019 | Diril et al. |
| 2020/0225996 A1 | 7/2020 | Sharma et al. |

FOREIGN PATENT DOCUMENTS

| | | | | |
|---|---|---|---|---|
| CN | 111078189 A | * | 4/2020 | ........... G06F 7/4985 |
| CN | 111523653 A | | 8/2020 | |
| CN | 111523655 A | * | 8/2020 | ............. G06F 1/324 |

OTHER PUBLICATIONS

Liu Qinrang, et al., Calculation Optimization for Convolutional Neural Networks and FPGA-based Accelerator Design Using the Parameters Sparsity, Journal of Electronics & Information Technology, 2018, pp. 1368-1374, vol. 40, No. 6.

\* cited by examiner

METHOD AND SYSTEM FOR ACCELERATING EQUILIBRIUM COMPUTATION ON SPARSE RECURRENT NEURAL NETWORK

CROSS REFERENCE TO THE RELATED APPLICATIONS

This application is the national phase entry of International Application No. PCT/CN2020/124656, filed on Oct. 29, 2020, which is based upon and claims priority to Chinese Patent Application No. 202011137315.2, filed on Oct. 22, 2020, the entire contents of which are incorporated herein by reference.

TECHNICAL FIELD

The present disclosure relates to the technical field of hardware accelerators of sparse recurrent neural networks, and more specifically, to an equilibrium computation acceleration method and system for a sparse recurrent neural network.

BACKGROUND

Compared with a feedforward neural network that is a static network and in which information is transferred in one way, a network output relies only on a current input, and the like, a sparse recurrent neural network is a special neural network structure because its output sequence is related to both the current input and a previous output. Specifically, the sparse recurrent neural network memorizes previous output information and uses it to calculate a current output. Therefore, in the sparse recurrent neural network, nodes between hidden layers are connected, and an input of the hidden layer includes both an output of an input layer and an output of the hidden layer at a previous time point. At present, the sparse recurrent neural network is mainly applied to technical issues that need to consider a time sequence, involving natural language processing, machine translation, speech recognition, image description and generation, and other technical fields.

In a computation process of the sparse recurrent neural network, main computation operations are a series of matrix multiplication operations, and vector and matrix multiplication operations are taken as core computation operations. When facing a large quantity of multiplication operations, the sparse recurrent neural network not only needs to design a computation array with a larger order of magnitude, but also needs to frequently access this computation array. However, a large part of weights of neurons in the sparse recurrent neural network are "0", so there will be weights of many elements "0" in a weight matrix, which results in a sparsity difference between different weight matrices. In the prior art, sparsity of the weight matrix is not considered in the computation of the sparse recurrent neural network. Therefore, a same voltage and clock frequency are supplied to the computation array at all time points during the computation, which inevitably causes a waste of a power consumption for the computation array, resulting in a high power consumption and a performance fluctuation for a computation module.

Therefore, during the computation of the sparse recurrent neural network, the sparsity of the weight matrix is determined to dynamically adjust the voltage and the clock frequency of the computation array to reduce the power consumption, which has high practical application value.

SUMMARY

In order to overcome the disadvantages in the prior art, the present disclosure provides an equilibrium computation acceleration method and system for a sparse recurrent neural network, to determine scheduling information based on an arbitration result of sparsity of a weight matrix, select a computation submodule having operating voltage and operating frequency that match the scheduling information or a computation submodule having operating voltage and operating frequency that are adjusted to match the scheduling information, and use the selected computation submodule to perform a zero-hop operation and a multiply-add operation in sequence, thereby accelerating equilibrium computation. In this way, when a computation speed is improved, a power consumption and a voltage fluctuation during computation are reduced through equilibrium scheduling.

The present disclosure provides the following technical solutions.

An equilibrium computation acceleration method for a sparse recurrent neural network is provided, specifically including the following steps:

step 1: inputting a computation matrix and a weight matrix;

step 2: arbitrating sparsity of the weight matrix, and determining scheduling information based on an arbitration result, where the scheduling information includes an actual operating voltage and an actual operating frequency; and the actual operating voltage meets the following relationship:

$$U_{real} = U_0 - \Delta \cdot U_\Delta$$

where, $U_{real}$ represents the actual operating voltage;

$U_0$ represents a reference operating voltage;

$U_\Delta$ represents an adjusted voltage related to the sparsity of the weight matrix and meets $U_\Delta < \alpha \cdot U_0$, where α represents an empirical value specified based on a computation scenario and a hardware configuration, and generally meets: $0.1 < \alpha < 0.5$; and $\Delta$ represents the arbitration result of the sparsity of the weight matrix;

step 3: determining a working state of a computation submodule, where the computation submodule has two working states: an idle state and a non-idle state;

step 4: selecting, based on a determining result obtained in the step 3, a computation submodule having operating voltage and operating frequency that match the scheduling information or a computation submodule having operating voltage and operating frequency that are adjusted to match the scheduling information; and step 5: using the computation submodule selected in the step 4 to perform a zero-hop operation and a multiply-add operation in sequence, to accelerate equilibrium computation.

Preferably,
in the step 2, the arbitration result of the sparsity of the weight matrix is a proportion of elements with a value of "0" in the weight matrix, and the following relationship is satisfied:

$$\Delta = \frac{N_0}{\overline{N_0} + N_0}$$

where $\Delta$ represents the proportion of the elements with the value of "0" in the weight matrix, $N_0$ represents a quantity of elements with the value of "0" in the weight matrix, and $\overline{N_0}$ represents a quantity of elements with values that are not "0" in the weight matrix.

Preferably,
the step 4 specifically includes:
step 4.1: for an idle computation submodule, selecting the computation submodule having operating voltage and operating frequency that match the scheduling information or the computation submodule having operating voltage and operating frequency that are adjusted to match the scheduling information; and
step 4.2: for a non-idle computation submodule, determining a state of an input queue of the computation module, and then selecting the computation submodule having operating voltage and operating frequency that match the scheduling information or the computation submodule having operating voltage and operating frequency that are adjusted to match the scheduling information.

Preferably, in the step 4.1,
for an idle computation submodule having operating voltage and operating frequency that match the scheduling information, the computation matrix and the weight matrix are directly input into the computation submodule; and
for an idle computation submodule having operating voltage or operating frequency that does not match the scheduling information, the computation matrix and the weight matrix are input into the computation submodule, and the operating voltage or the operating frequency of the computation submodule is adjusted.

Preferably, in the step 4.2,
the input queue of the non-idle computation module has two states: having sufficient space and having insufficient space;
for a non-idle computation submodule having operating voltage and operating frequency that match the scheduling information, if an input queue of the computation submodule has sufficient space, the computation matrix and the weight matrix are directly input into the computation submodule;
for a non-idle computation submodule having operating voltage or operating frequency that does not match the scheduling information, if an input queue of the computation submodule has sufficient space, the computation matrix and the weight matrix are directly input into the computation submodule, and the operating voltage or the operating frequency of the computation submodule is adjusted; and
for any non-idle computation submodule, if an input queue of the computation submodule has insufficient space, the computation is paused.

Preferably,
the step 5 specifically includes:
step 5.1: performing the zero-hop operation, namely searching and storing a numerical value and a relative position of a non-zero element in the weight matrix; and
step 5.2: performing the multiply-add operation, namely a multiplication operation and an accumulation operation.

Preferably, the operating voltage and the operating frequency of the computation submodule are adjusted by: first selecting a computation submodule with an approximate operating voltage or operating frequency; and then increasing or decreasing the operating voltage of the computation module, and re-dividing the operating frequency of the computation module; and an adjustment process of the operating voltage and the operating frequency of the computation submodule includes: increasing the operating voltage and the operating frequency to a maximum value separately, and generating a new clock frequency by using a frequency divider; determining whether there is a total pre-error in a current clock frequency, and increasing the operating voltage if there is a total pre-error, or decreasing the operating voltage if there is no pre-error; and after a plurality of adjustments, if it is determined that there is no total pre-error in the current clock frequency twice or more consecutively, holding a current operating voltage, and ending the adjustment.

An equilibrium computation acceleration system for a sparse recurrent neural network is provided, including: a data transmission module, an equilibrium computation scheduling module, and a voltage-adjustable equilibrium computation module, where the data transmission module is configured to input a computation matrix and a weight matrix into the equilibrium computation scheduling module, and store and output a computation result; and the data transmission module is equipped with a built-in read/write memory and a built-in weight memory, where the read/write memory is configured to read or write the computation matrix and the computation result, and the weight memory is configured to store the weight matrix;

the equilibrium computation scheduling module is configured to arbitrate sparsity of the weight matrix and issue a scheduling instruction to the voltage-adjustable equilibrium computation module based on an arbitration result;

the equilibrium computation scheduling module includes a computation sparsity arbitration submodule and an equilibrium scheduling submodule; and the weight matrix of a neural network first enters the computation sparsity arbitration submodule for sparsity arbitration, then the arbitration result is input into the equilibrium scheduling submodule, and finally the equilibrium scheduling submodule sends scheduling information to the voltage-adjustable equilibrium computation module;

the voltage-adjustable equilibrium computation module includes a plurality of independent computation submodules with different actual operating voltages and actual operating frequencies, and the voltage-adjustable equilibrium computation module is configured to match the computation submodules according to the scheduling instruction;

each of the computation submodules is equipped with a built-in zero-hop operation submodule and a built-in multiply-add operation submodule, to conduct a zero-hop operation and a multiply-add operation respectively; and each of the computation submodules also has a built-in error monitor for adjusting the operating voltage and the operating frequency of the computation submodules respectively;

the read/write memory includes a first block and a second block, where before current-layer computation starts, the equilibrium computation scheduling module reads the computation matrix from the first block; after the current-layer computation is completed, the voltage-adjustable equilibrium computation module writes a computation result into the second block and exchanges read and write configurations between the first block and the second block; and before next-layer computation starts, the equilibrium computation scheduling module reads the computation matrix from the second block, and the voltage-adjustable equilibrium computation module writes a computation result into the first block;

each of the computation submodules has a first data input port, a second data input port, and a data output port, where the first data input port receives weight matrix data, the second data input port receives computation matrix data, and the data output port sends computation result data; and for each of the computation submodules, the weight matrix and the computation matrix are input into the computation submodule from the first data input port and the second data input port respectively, where the zero-hop operation submodule first performs the zero-hop operation on the weight matrix; data obtained after the zero-hop operation is then input into the multiply-add operation submodule for a multiplication operation and an accumulation operation; and a final computation result is sent through the data output port;

the multiply-add operation submodule includes: a computation unit array, a temporary data register array, an input queue, and an output queue;

the weight matrix obtained after the zero-hop operation and the computation matrix enter the input queue, and then are input into the computation unit array by the input queue according to a computation order; the computation result is input into the output queue by the computation unit array; and in a computation process, intermediate data generated is stored in the temporary data register array;

the computation unit array includes m×n computation units, and each of the computation units includes a weight register, an input data register, an output data register, and an arithmetic unit;

the arithmetic unit includes a multiplication arithmetic logic unit and an accumulation arithmetic logic unit;

the weight register and the input data register provide the weight matrix and the computation matrix respectively for the multiplication arithmetic logic unit in the arithmetic unit; and both data obtained through the multiplication operation and data in the temporary data register array are input into the accumulation arithmetic logic unit, and a result of the accumulation operation is input into the output data register and output as a final computation result;

N error monitors are disposed at different positions of the computation unit array to monitor voltage and temperature changes;

when a computation unit within a jurisdiction of the error monitors does not have a sufficient time margin to ensure normal operation, the error monitors generate pre-errors; and a total pre-error is obtained after the pre-errors generated by the error monitors pass through an OR gate chain, the total pre-error is input into a voltage regulator, and then the voltage regulator sends a voltage adjustment signal to a voltage converter; and the voltage adjustment signal sent by the voltage regulator includes a voltage increasing signal, a voltage holding signal, and a voltage decreasing signal; and the voltage converter adjusts a voltage of the computation unit array based on the signal.

Compared with the prior art, the present disclosure has the following advantages.

(1) Computation capabilities of different acceleration modules can be dynamically adjusted to achieve an optimal hardware configuration, and fully reduce consumed hardware resources and costs while meeting requirements of actual computation and application scenarios.

(2) A complete solution with high energy efficiency is provided to accelerate a sparse recurrent neural network. Compared with the prior art, use of a hardware resource is more reasonable under dynamic adjustment, ultimately achieving better energy efficiency performance.

DETAILED DESCRIPTION OF THE EMBODIMENTS

The present disclosure will be described in further detail below with reference to embodiments.

Figure 1:
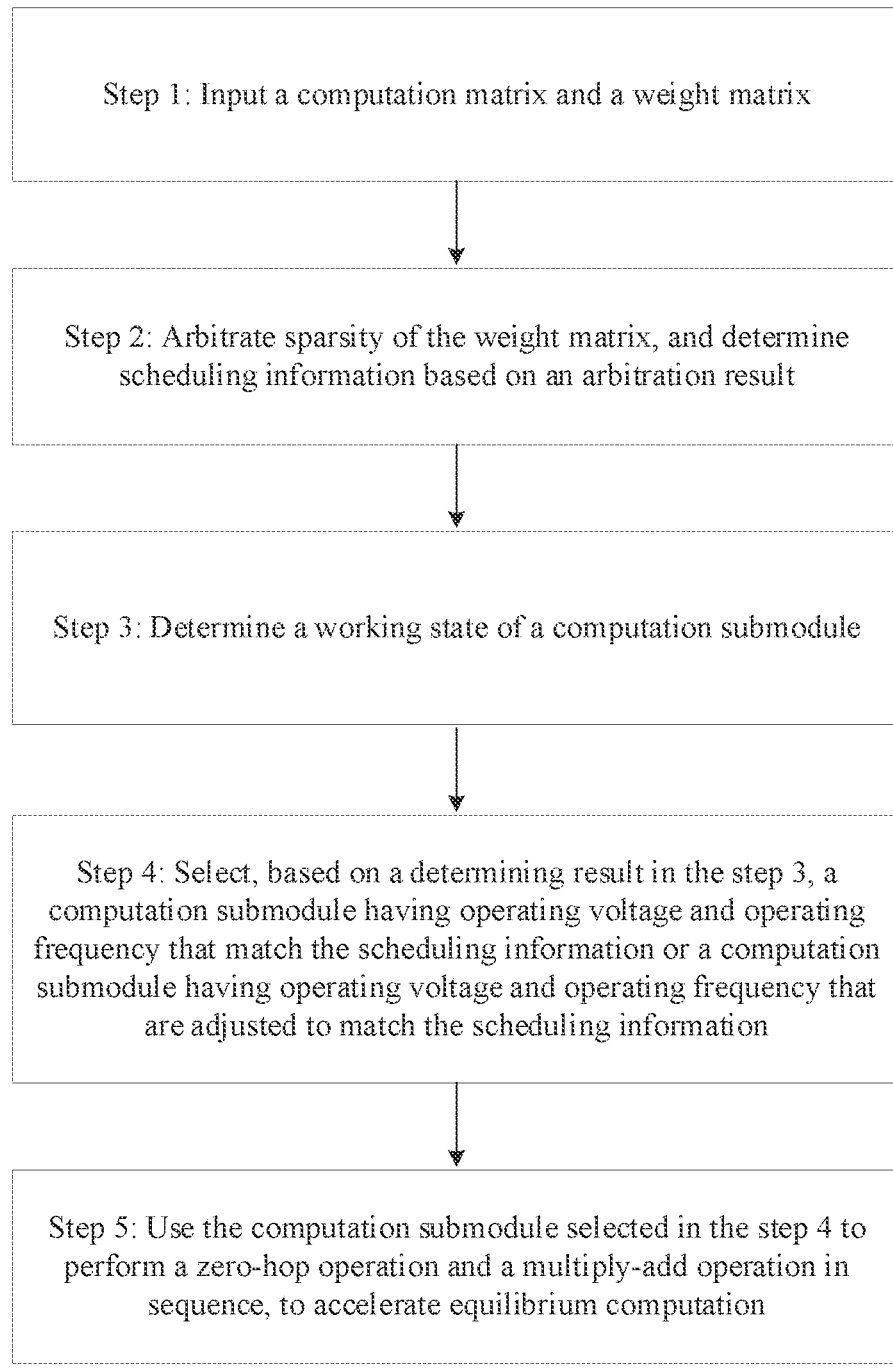
FIG. 1 is a flowchart of an equilibrium computation acceleration method for a sparse recurrent neural network according to the present disclosure.

As shown in FIG. 1, an equilibrium computation acceleration method for a sparse recurrent neural network specifically includes the following steps.

Step 1: A computation matrix and a weight matrix are input.

Step 2: Sparsity of the weight matrix is arbitrated, and scheduling information is determined based on an arbitration result.

Specifically,

An actual operating voltage meets the following relationship:

$$U_{real} = U_0 - \Delta \cdot U_\Delta \quad 5$$

In the above formula, $U_{real}$ represents the actual operating voltage;

$U_0$ represents a reference operating voltage;

$U_\Delta$ represents an adjusted voltage related to the sparsity of the weight matrix and meets $U_\Delta < \alpha \cdot U_0$, where $\alpha$ represents an empirical value specified based on a computation scenario and a hardware configuration, and generally meets the following condition: $0.1 < \alpha < 0.5$; and $\Delta$ represents the arbitration result of the sparsity of the weight matrix.

The arbitration result of the sparsity of the weight matrix is a proportion of elements with a value of "0" in the weight matrix, and the following relationship is satisfied:

$$\Delta = \frac{N_0}{\overline{N_0} + N_0}$$

In the above formula, $\Delta$ represents the proportion of the elements with the value of "0" in the weight matrix, $N_0$ represents a quantity of elements with the value of "0" in the weight matrix, and $\overline{N_0}$ represents a quantity of elements with values that are not "0" in the weight matrix.

It can be seen that a higher proportion of the "0" element in the weight matrix leads to a lower actual operating voltage, and a lower proportion of the "0" element in the weight matrix leads to a higher actual operating voltage.

Step 3: A working state of a computation submodule is determined, where the computation submodule has two working states: an idle state and a non-idle state.

Step 4: A computation submodule having operating voltage and operating frequency that match the scheduling information or a computation submodule having operating voltage and operating frequency that are adjusted to match the scheduling information is selected based on a determining result obtained in the step 3.

Figure 2:
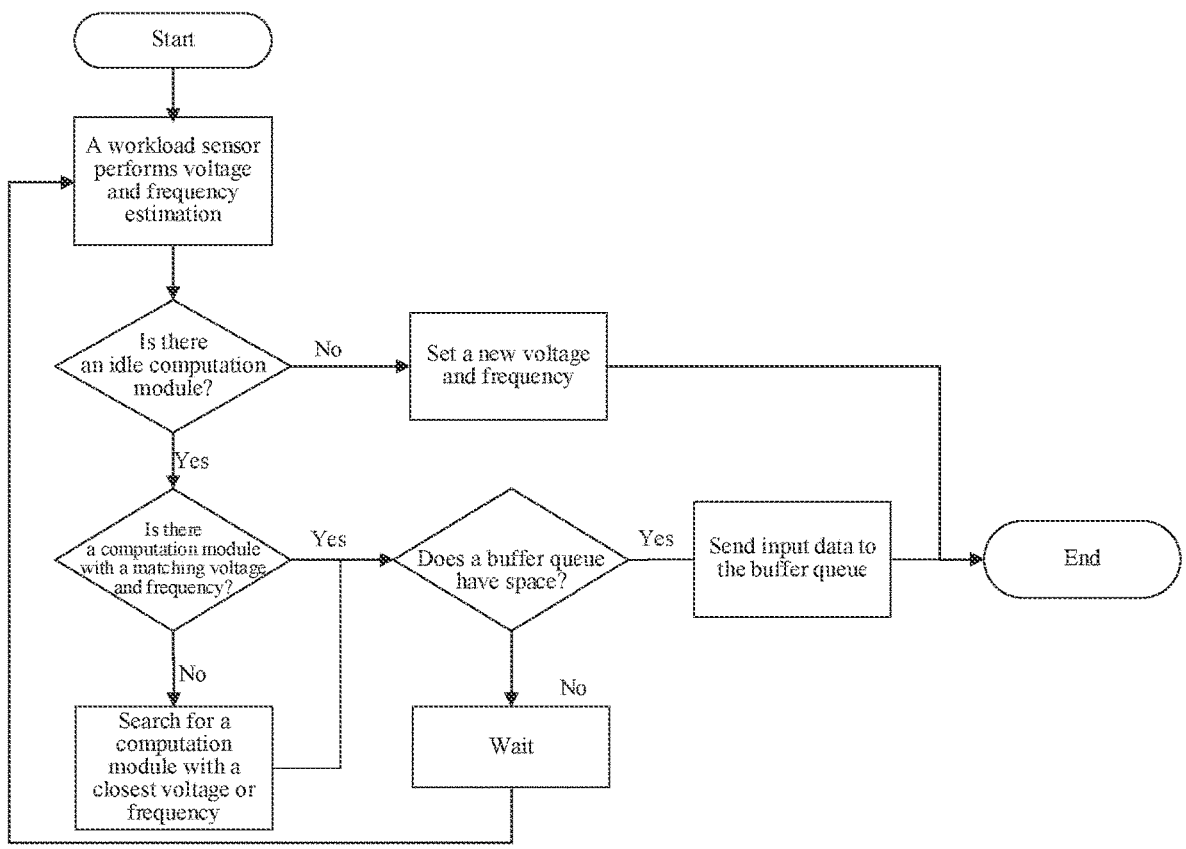
FIG. 2 is a flowchart of an equilibrium scheduling module of an equilibrium computation acceleration system for a sparse recurrent neural network according to the present disclosure.

As shown in FIG. 2, the step 4 specifically includes the following steps:

Step 4.1: For an idle computation module, the computation submodule having operating voltage and operating frequency that match the scheduling information or the computation submodule having operating voltage and operating frequency that are adjusted to match the scheduling information is selected.

Step 4.2: For a non-idle computation module, a state of an input queue of the computation module is determined, and the computation submodule having operating voltage and operating frequency that match the scheduling information or the computation submodule having operating voltage and operating frequency that are adjusted to match the scheduling information is selected.

Specifically, in the step 4.1, for an idle computation submodule having operating voltage and operating frequency that match the scheduling information, the computation matrix and the weight matrix are directly input into the computation submodule; and for an idle computation submodule having operating voltage and operating frequency that do not match the scheduling information, the computation matrix and the weight matrix are input into the computation submodule, and the operating voltage or the operating frequency of the computation submodule is adjusted.

In the step 4.2, the input queue of the non-idle computation module has two states: having sufficient space and having insufficient space.

For a non-idle computation submodule having operating voltage and operating frequency that match the scheduling information, if an input queue of the computation submodule has sufficient space, the computation matrix and the weight matrix are directly input into the computation submodule.

For a non-idle computation submodule having operating voltage or operating frequency that does not match the scheduling information, if an input queue of the computation submodule has sufficient space, the computation matrix and the weight matrix are directly input into the computation submodule, and the operating voltage or the operating frequency of the computation submodule is adjusted.

For any non-idle computation submodule, if an input queue of the computation submodule has insufficient space, the computation is paused.

Specifically, the operating voltage and the operating frequency of the computation submodule are adjusted, which specifically includes: first selecting a computation submodule with an approximate operating voltage or operating frequency; and then increasing or decreasing the operating voltage of the computation module, and re-dividing the operating frequency of the computation module.

Figure 3A:
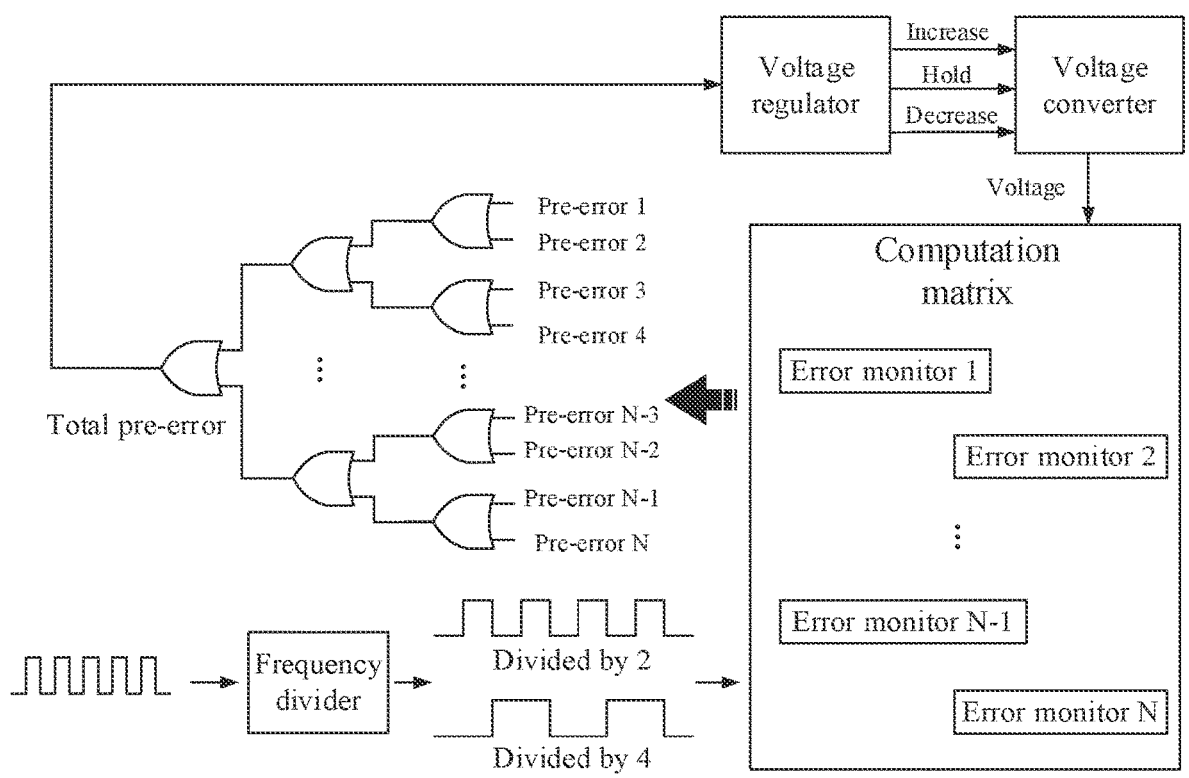
FIGS. 3A-3C are schematic diagrams of a function configuration for dynamic voltage adjustment of an equilibrium computation acceleration system for a sparse recurrent neural network according to the present disclosure.
Figure 3B:
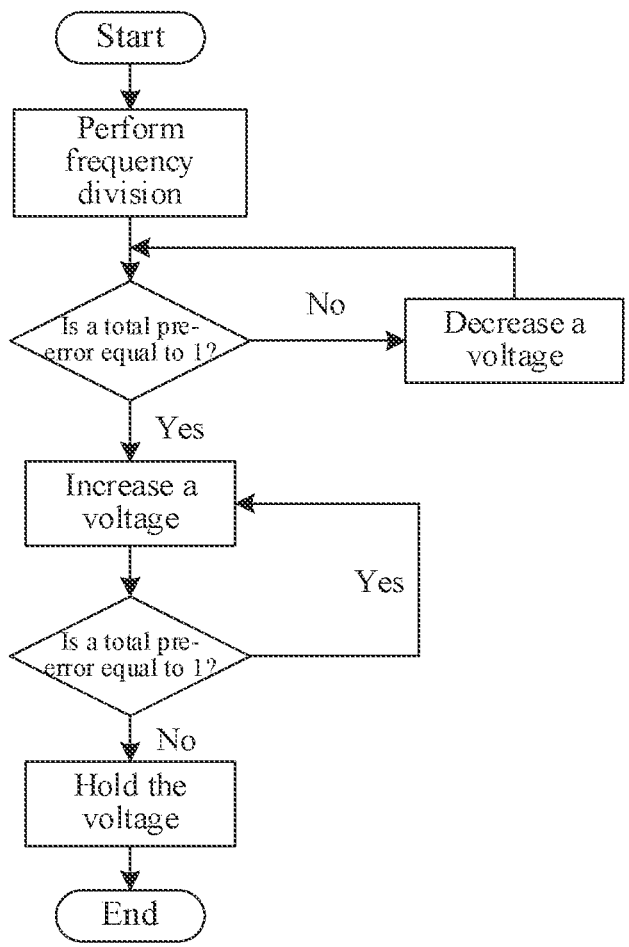
Figure 3C:
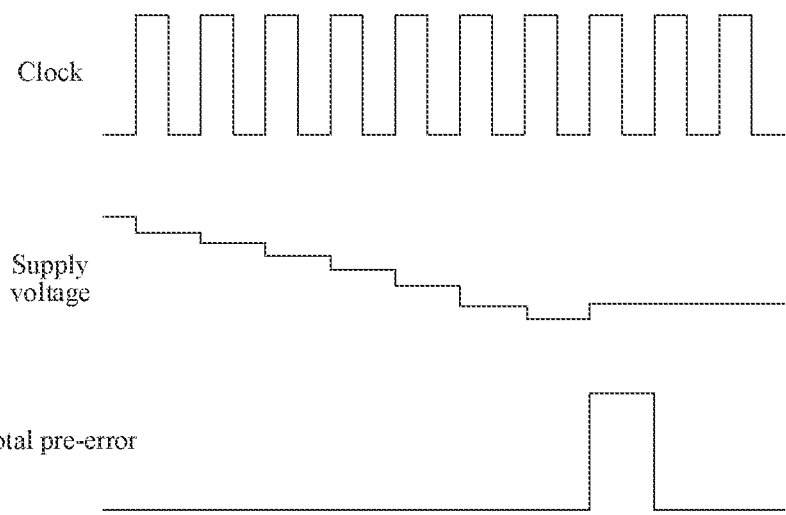

As shown in FIGS. 3A-3C, an adjustment process of the operating voltage and the operating frequency of the computation submodule in this preferred embodiment is specifically as follows.

(1) An operating voltage and an operating frequency of each computation unit are increased to a maximum value separately.

(2) Frequency division is performed, in other words, a frequency divider is used to generate a new clock frequency.

(3) Whether there is a total pre-error in the current clock frequency is determined, in other words, whether the total pre-error is 1 is determined; and the operating voltage is increased if the total pre-error is 1, or the operating voltage is decreased and this step is repeated if the total pre-error is not 1.

(4) After a plurality of adjustments, if it is determined that there is no total pre-error in the current clock frequency twice or more consecutively, the current operating voltage is held, and the adjustment ends.

Step 5: The computation submodule selected in the step 4 is used to perform a zero-hop operation and a multiply-add operation in sequence, to accelerate equilibrium computation.

The step 5 specifically includes the following steps.

Step 5.1: The zero-hop operation is performed, namely a pointer $C_p$ is used to find each non-zero element in the weight matrix.

Specifically, for each column of elements, only a numerical value $N_v$ and a relative position $R_i$ of a non-zero element are stored. The vector $N_v$ represents the numerical value of the non-zero element, and the vector $R_i$ represents the relative position of the non-zero element.

When data in the weight matrix includes does not include 0, a multiply-add arithmetic unit is continuously used for computation. When the data in the weight matrix includes 0, a jump operation is directly performed and 0 is output.

Step 5.2: The multiply-add operation, namely a multiplication operation and an accumulation operation, is performed.

Figure 4:
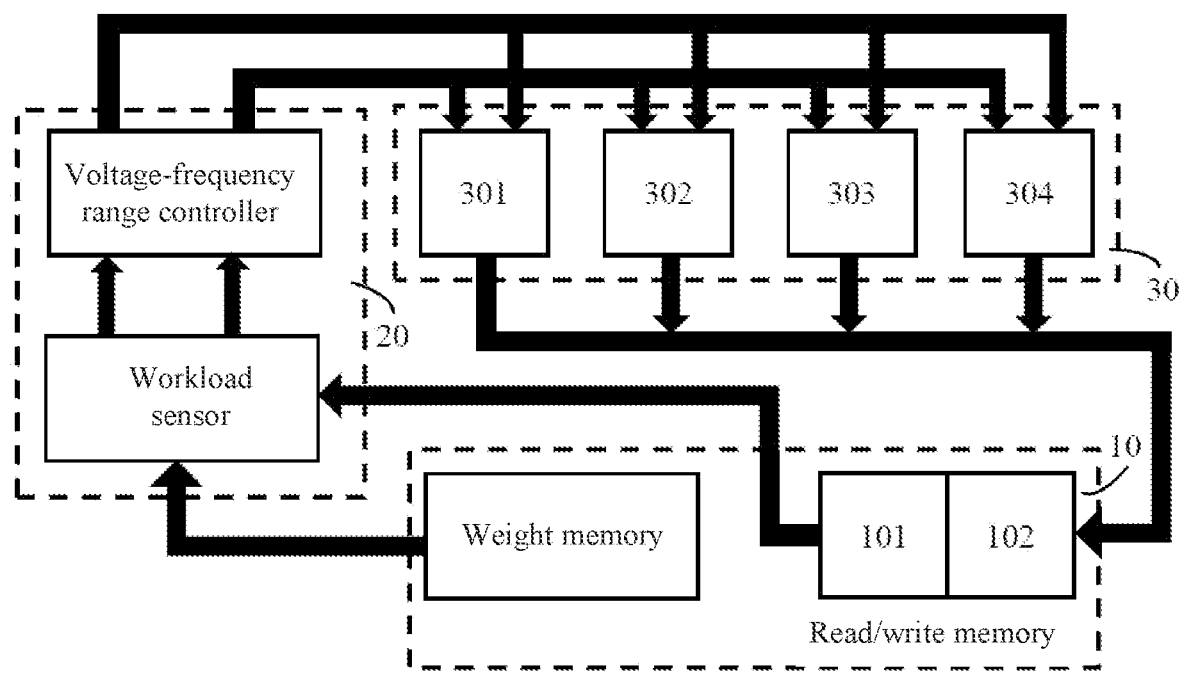
FIG. 4 is a schematic structural diagram of an equilibrium computation acceleration system for a sparse recurrent neural network according to the present disclosure.
Figure 5:
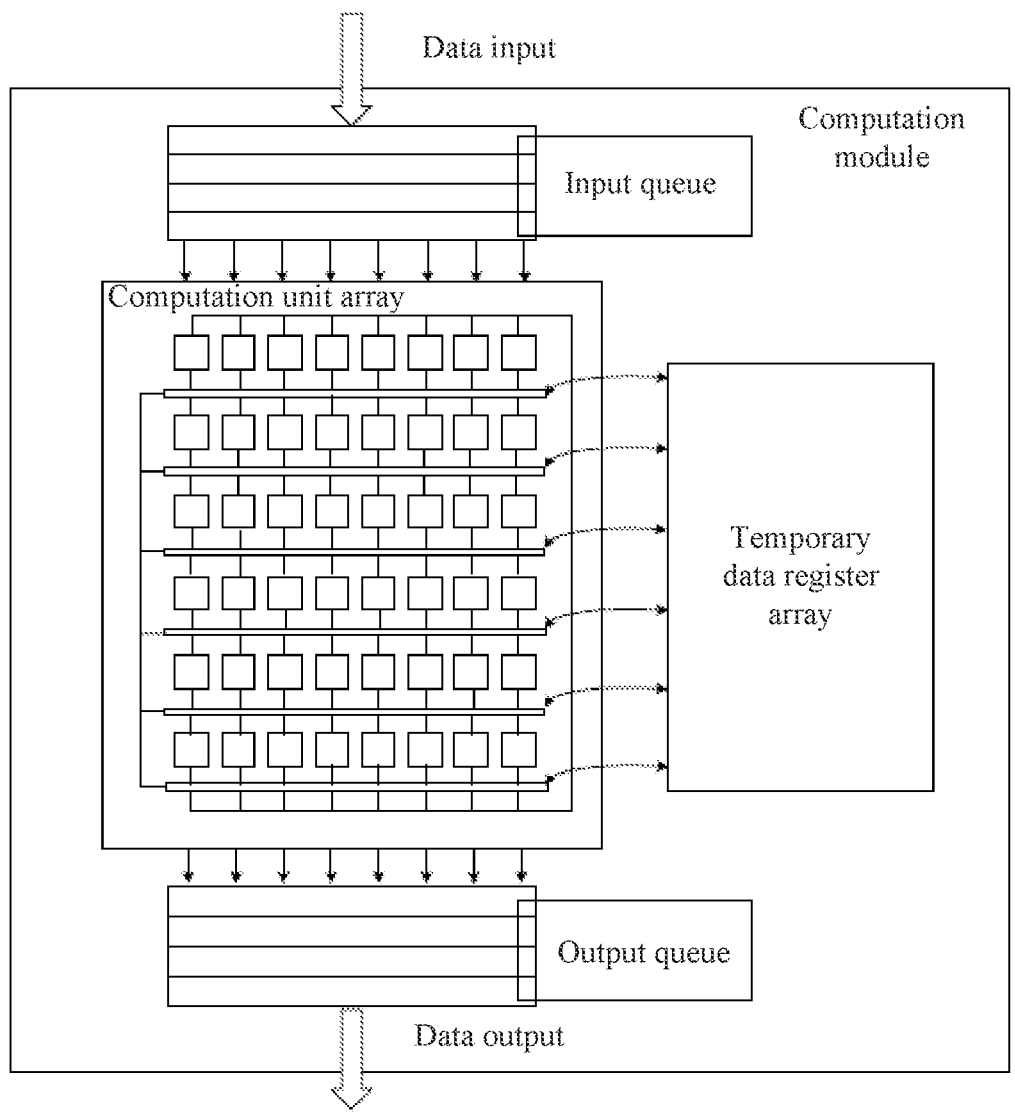
FIG. 5 is a schematic structural diagram of a voltage-adjustable equilibrium computation module of an equilibrium computation acceleration system for a sparse recurrent neural network according to the present disclosure.

As shown in FIG. 4, an equilibrium computation acceleration system for a sparse recurrent neural network includes: a data transmission module 10, an equilibrium computation scheduling module 20, and a voltage-adjustable equilibrium computation module 30.

The data transmission module 10 is configured to input a computation matrix and a weight matrix into the equilibrium computation scheduling module 20, and store and output a computation result. The data transmission module 10 is equipped with a built-in read/write memory and a built-in weight memory, where the read/write memory is configured to read or write the computation matrix and the computation result, and the weight memory is configured to store the weight matrix.

The equilibrium computation scheduling module 20 is configured to arbitrate sparsity of the weight matrix and issue a scheduling instruction to the voltage-adjustable equilibrium computation module 30 based on an arbitration result.

The equilibrium computation scheduling module 20 includes a computation sparsity arbitration submodule and an equilibrium scheduling submodule. The weight matrix of a neural network first enters the computation sparsity arbitration submodule for sparsity arbitration, then the arbitration result is input into the equilibrium scheduling submodule, and finally the equilibrium scheduling submodule sends scheduling information to the voltage-adjustable equilibrium computation module 30.

In a preferred embodiment of the present disclosure, a workload sensor is used as the computation sparsity arbitration submodule. The sensor first counts a quantity of "0" elements in the weight matrix, and obtains a corresponding operating voltage and operating frequency through division based on the quantity of "0" elements. A larger quantity of "0" elements in the weight matrix leads to a lower operating voltage in the scheduling instruction. On the contrary, a smaller quantity of "0" elements in the weight matrix leads to a higher operating voltage in the scheduling instruction.

In a preferred embodiment of the present disclosure, a voltage-frequency range controller is used as the equilibrium scheduling submodule to implement a scheduling operation of a computation submodule.

It is worth noting that those skilled in the art can freely design the computation sparsity arbitration submodule and the equilibrium scheduling submodule. The workload sensor and the voltage-frequency range controller used in the preferred embodiment of the present disclosure are non-restrictive and preferred choices.

With reference to FIG. 2, in a preferred embodiment of the present disclosure, a scheduling operation process of the equilibrium computation scheduling module is as follows.

(1) The workload sensor arbitrates the sparsity of the weight matrix, and then obtains a required operating voltage and operating frequency through division.

(2) Then, the voltage-frequency range controller determines whether there is an idle computation submodule; and if there is an idle computation submodule, determines whether there is a computation submodule with a matching voltage and frequency in the idle computation submodule, and performs a next step; or if there is no idle computation submodule, searches for a computation submodule with a closest voltage or frequency, and enters a next step after finding a required computation submodule.

(3) Whether there is still space in a buffer queue of the matching computation submodule in the previous step is determined, and input data is sent to the buffer queue of the matching computation submodule if there is space in the buffer queue of the matching computation submodule, or the operation is paused if there is no space in the buffer queue of the matching computation submodule.

The voltage-adjustable equilibrium computation module 30 is configured to match the computation submodule according to the scheduling instruction. As shown in FIG. 4, the voltage-adjustable equilibrium computation module 30 includes a plurality of independent computation submodules. In a preferred embodiment of the present disclosure, the voltage-adjustable equilibrium computation module 30 includes four computation submodules, namely, a first computation submodule 301, a second computation submodule 302, a third computation submodule 303, and a fourth computation submodule 304. Actual operating voltages and frequencies of these computation submodules are different.

Each of the computation submodules is equipped with a built-in zero-hop operation submodule and a built-in multiply-add operation submodule, to conduct a zero-hop operation and a multiply-add operation respectively; and each of the computation submodules also has a built-in error monitor for adjusting the operating voltage and the operating frequency of the computation submodules respectively.

The read/write memory includes a first block 101 and a second block 102. Before current-layer computation starts, the equilibrium computation scheduling module 20 reads the computation matrix from the first block 101; and after the current-layer computation is completed, the voltage-adjustable equilibrium computation module 20 writes a computation result into the second block 102 and exchanges read and write configurations between the first block 101 and the second block 102. Before next-layer computation starts, the equilibrium computation scheduling module 20 reads the computation matrix from the second block 102, and the voltage-adjustable equilibrium computation module 20 writes a computation result into the first block 101. Therefore, in a process of transmitting computation matrix and vector data, additional data transmission is reduced by quickly exchanging a configuration of the read/write memory.

Each of the computation submodules has a first data input port, a second data input port, and a data output port, where the first data input port receives weight matrix data, the second data input port receives computation matrix data, and the data output port sends computation result data.

For each of the computation submodules, the weight matrix and the computation matrix are input into the computation submodule from the first data input port and the second data input port respectively, where the zero-hop operation submodule first performs the zero-hop operation on the weight matrix; data obtained after the zero-hop operation is then input into the multiply-add operation submodule for the multiplication operation and the accumulation operation; and a final computation result is sent through the data output port.

The multiply-add operation submodule includes: a computation unit array, a temporary data register array, an input queue, and an output queue.

First, a weight matrix obtained after the zero-hop operation and the computation matrix enter the input queue, and then are input into the computation unit array by the input queue according to a computation order. The computation result is input into the output queue by the computation unit array. In a computation process, intermediate data generated is stored in the temporary data register array. This can improve a data throughput capability of the computation unit array, reduce a latency, and meets a demand for a huge amount of data processed in a neural network.

Figure 6:
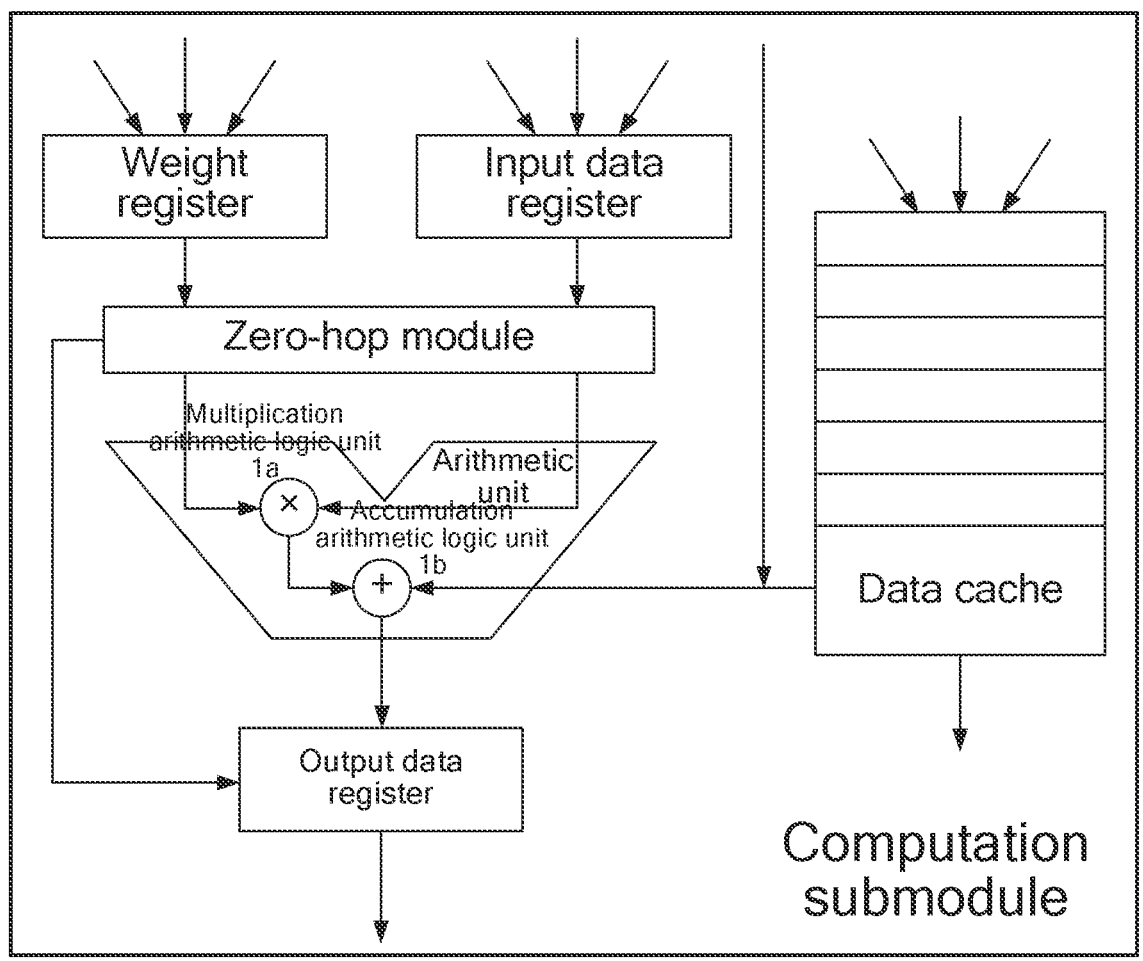
FIG. 6 is a schematic structural diagram of a computation unit of an equilibrium computation acceleration system for a sparse recurrent neural network according to the present disclosure.

The computation unit array includes m×n computation units. As shown in FIG. 6, each of the computation units includes a weight register, an input data register, an output data register, and an arithmetic unit. The arithmetic unit includes a multiplication arithmetic logic unit 1a and an accumulation arithmetic logic unit 1b.

The weight register and the input data register provide the weight matrix and the computation matrix for the multiplication arithmetic logic unit in the arithmetic unit respectively; and both data obtained through the multiplication operation and data in the temporary data register array are input into the accumulation arithmetic logic unit, and a result of the accumulation operation is input into the output data register and output as a final computation result.

N error monitors are disposed at different positions of the computation unit array to monitor voltage and temperature changes. Each of the error monitors consists of a register and an inverter chain.

When a computation unit within a jurisdiction of the error monitor does not have a sufficient time margin to ensure normal operation, the error monitor generates a pre-error; and a total pre-error is obtained after pre-errors generated by the error monitors pass through a OR gate chain, the total pre-error is input into a voltage regulator, and then the voltage regulator sends a voltage adjustment signal to a voltage converter.

The voltage adjustment signal sent by the voltage regulator includes a voltage increasing signal, a voltage holding signal, and a voltage decreasing signal; and the voltage converter adjusts a voltage of the computation unit array based on the signal.

The weight register and the input data register each provide the input data for the multiplication arithmetic logic unit in the arithmetic unit; and both data obtained through the multiplication operation and data in the temporary data register array are input into the accumulation arithmetic logic unit, and a result of the accumulation operation is input into the output data register and output as a final computation result. Therefore, the multiplication operation and the accumulation operation can be implemented by one computation unit, achieving a simple structure and improving computation efficiency.

In an equilibrium computation acceleration module for a sparse recurrent neural network in the present disclosure, error monitors are disposed at different positions of a computation unit array to monitor voltage and temperature changes. Based on FIG. 3, it can be seen that N error monitors are disposed in one computation unit array, namely a first error monitor, a second error monitor, . . . an $(N-1)^{th}$ error monitor, and an $N^{th}$ error monitor.

The foregoing specific implementations and embodiments are specific support for the technical ideas of the equilibrium computation acceleration module and method for a sparse recurrent neural network in the present disclosure, rather than limiting the protection scope of the present disclosure. Any equivalent variations and changes made on the basis of the technical solutions based on the technical ideas proposed in the present disclosure should still fall within the protection scope of the present disclosure.

What is claimed is:

1. An equilibrium computation acceleration method for a sparse recurrent neural network, comprising the following steps:

step 1: inputting a computation matrix and a weight matrix;

step 2: arbitrating sparsity of the weight matrix, and determining scheduling information based on an arbitration result, wherein the scheduling information comprises an actual operating voltage and an actual operating frequency; and the actual operating voltage meets the following relationship:

$$U_{real}=U_0-\Delta \cdot U_\Delta$$

wherein, $U_{real}$ represents the actual operating voltage;

$U_0$ represents a reference operating voltage;

$U_\Delta$ represents an adjusted voltage related to the sparsity of the weight matrix and meets $U_\Delta < \alpha \cdot U_0$, wherein a represents an empirical value specified based on a computation scenario and a hardware configuration, and meets $0.1 < \alpha < 0.5$; and $\Delta$ represents the arbitration result of the sparsity of the weight matrix;

step 3: determining a working state of a computation submodule, wherein the computation submodule has two working states: an idle state and a non-idle state;

step 4: based on a determining result obtained in the step 3, for an idle computation submodule, selecting a computation submodule having operating voltage and operating frequency that match the scheduling information or a computation submodule having operating voltage and operating frequency that are adjusted to match the scheduling information;

for a non-idle computation submodule, determining a state of an input queue of the non-idle computation submodule, and then selecting a computation submodule having operating voltage and operating frequency that match the scheduling information or a computation submodule having operating voltage and operating frequency that are adjusted to match the scheduling information, wherein the input queue of the non-idle computation submodule has two states: having sufficient space and having insufficient space;

an adjustment process of the operating voltage and the operating frequency of the computation submodule comprises: increasing the operating voltage and the operating frequency to a maximum value separately, and generating a new clock frequency by using a frequency divider, determining whether there is a total pre-error in a current clock frequency, and increasing the operating voltage if there is a total pre-error, or decreasing the operating voltage if there is no pre-error; and after a plurality of adjustments, if it is determined that there is no total pre-error in the current clock frequency twice or more consecutively, holding a current operating voltage, and ending the adjustment; and step 5: using the computation submodule selected in the step 4 to perform a zero-hop operation and a multiply-add operation in sequence, to accelerate equilibrium computation.

2. The equilibrium computation acceleration method for the sparse recurrent neural network according to claim 1, wherein, in the step 2,
the arbitration result of the sparsity of the weight matrix is a proportion of elements with a value of "0" in the weight matrix, and the following relationship is satisfied:

$$\Delta = \frac{N_0}{\overline{N_0} + N_0}$$

wherein,
$\Delta$ represents the proportion of the elements with the value of "0" in the weight matrix,
$N_0$ represents a quantity of the elements with the value of "0" in the weight matrix, and
$\overline{N_0}$ represents a quantity of elements with values that are not "0" in the weight matrix.

3. The equilibrium computation acceleration method for the sparse recurrent neural network according to claim 1, wherein,
for the idle computation submodule having operating voltage and operating frequency that match the scheduling information, the computation matrix and the weight matrix are directly input into the computation submodule; and
for the idle computation submodule having operating voltage or operating frequency that does not match the scheduling information, the computation matrix and the weight matrix are input into the computation submodule, and the operating voltage or the operating frequency of the computation submodule is adjusted.

4. The equilibrium computation acceleration method for the sparse recurrent neural network according to claim 1, wherein,
for the non-idle computation submodule having operating voltage and operating frequency that match the scheduling information, if an input queue of the computation submodule has sufficient space, the computation matrix and the weight matrix are directly input into the computation submodule;
for the non-idle computation submodule having operating voltage or operating frequency that does not match the scheduling information, if an input queue of the computation submodule has sufficient space, the computation matrix and the weight matrix are directly input into the computation submodule, and the operating voltage or the operating frequency of the computation submodule is adjusted; and
for any non-idle computation submodule, if an input queue of the computation submodule has insufficient space, the computation is paused.

5. The equilibrium computation acceleration method for the sparse recurrent neural network according to claim 1, wherein,
the step 5 specifically comprises:
step 5.1: performing the zero-hop operation, namely searching and storing a numerical value and a relative position of a non-zero element in the weight matrix; and
step 5.2: performing the multiply-add operation, namely a multiplication operation and an accumulation operation.

6. The equilibrium computation acceleration method for the sparse recurrent neural network according to claim 1, wherein the operating voltage and the operating frequency of the computation submodule are adjusted by: first selecting a computation submodule with an approximate operating voltage or operating frequency; and then increasing or decreasing the operating voltage of the computation module, and re-dividing the operating frequency of the computation module.

7. An equilibrium computation acceleration system for a sparse recurrent neural network based on the equilibrium computation acceleration method for the sparse recurrent neural network according to claim 1, comprising a data transmission module, an equilibrium computation scheduling module, and a voltage-adjustable equilibrium computation module, wherein, the data transmission module is configured to input the computation matrix and the weight matrix into the equilibrium computation scheduling module, and store and output a computation result; and the data transmission module is equipped with a built-in read/write memory and a built-in weight memory, wherein the read/write memory is configured to read or write the computation matrix and the computation result, and the weight memory is configured to store the weight matrix;

the equilibrium computation scheduling module is configured to arbitrate the sparsity of the weight matrix and issue a scheduling instruction to the voltage-adjustable equilibrium computation module based on the arbitration result;

the equilibrium computation scheduling module comprises a computation sparsity arbitration submodule and an equilibrium scheduling submodule; and the weight matrix of a neural network first enters the computation sparsity arbitration submodule for sparsity arbitration, then the arbitration result is input into the equilibrium scheduling submodule, and finally the equilibrium scheduling submodule sends the scheduling information to the voltage-adjustable equilibrium computation module;

the voltage-adjustable equilibrium computation module comprises a plurality of independent computation submodules with different actual operating voltages and actual operating frequencies, and the voltage-adjustable equilibrium computation module is configured to match the computation submodules according to the scheduling instruction; and each of the computation submodules is equipped with a built-in zero-hop operation submodule and a built-in multiply-add operation submodule, to conduct the zero-hop operation and the multiply-add operation respectively; the zero-hop operation submodule is configured to use a pointer to find elements with values that are not "0" in the weight matrix; for elements with a value of "0" in the weight matrix, the computation submodules output 0; for the elements with values that are not "0" in the weight matrix, the computation submodules output a computation result from the multiply-add operation submodule; and each of the computation submodules also has a built-in error monitor for adjusting the operating voltage and the operating frequency of the computation submodules respectively.

8. The equilibrium computation acceleration system for the sparse recurrent neural network according to claim 7, wherein, the read/write memory comprises a first block and a second block, wherein before current-layer computation starts, the equilibrium computation scheduling module reads the computation matrix from the first block;

after the current-layer computation is completed, the voltage-adjustable equilibrium computation module writes the computation result into the second block and exchanges read and write configurations between the first block and the second block; and before next-layer computation starts, the equilibrium computation scheduling module reads the computation matrix from the second block, and the voltage-adjustable equilibrium computation module writes the computation result into the first block.

9. The equilibrium computation acceleration system for the sparse recurrent neural network according to claim 7, wherein, each of the computation submodules has a first data input port, a second data input port, and a data output port, wherein the first data input port receives weight matrix data, the second data input port receives computation matrix data, and the data output port sends computation result data; and for each of the computation submodules, the weight matrix and the computation matrix are input into the computation submodule from the first data input port and the second data input port respectively, wherein the zero-hop operation submodule first performs the zero-hop operation on the weight matrix; data obtained after the zero-hop operation is then input into the multiply-add operation submodule for a multiplication operation and an accumulation operation; and a final computation result is sent through the data output port.

10. The equilibrium computation acceleration system for the sparse recurrent neural network according to claim 7, wherein, the multiply-add operation submodule comprises: a computation unit array, a temporary data register array, an input queue, and an output queue;

the weight matrix obtained after the zero-hop operation and the computation matrix enter the input queue, and then are input into the computation unit array by the input queue according to a computation order; the computation result is input into the output queue by the computation unit array; and in a computation process, intermediate data generated is stored in the temporary data register array.

11. The equilibrium computation acceleration system for the sparse recurrent neural network according to claim 10, wherein, the computation unit array comprises m×n computation units, and each of the computation units comprises a weight register, an input data register, an output data register, and an arithmetic unit;

the arithmetic unit comprises a multiplication arithmetic logic unit and an accumulation arithmetic logic unit; and the weight register and the input data register provide the weight matrix and the computation matrix respectively for the multiplication arithmetic logic unit in the arithmetic unit; and both data obtained through a multiplication operation and data in the temporary data register array are input into the accumulation arithmetic logic unit, and a result of an accumulation operation is input into the output data register and output as a final computation result.

12. The equilibrium computation acceleration system for the sparse recurrent neural network according to claim 10, wherein, N error monitors are disposed at different positions of the computation unit array to monitor voltage and temperature changes;

when computation units within a jurisdiction of the error monitors do not have a sufficient time margin to ensure normal operation, the error monitors generate pre-errors; and a total pre-error is obtained after the pre-errors generated by the error monitors pass through an OR gate chain, the total pre-error is input into a voltage regulator, and then the voltage regulator sends a voltage adjustment signal to a voltage converter; and the voltage adjustment signal sent by the voltage regulator comprises a voltage increasing signal, a voltage holding signal, and a voltage decreasing signal; and the voltage converter adjusts a voltage of the computation unit array based on the signal.

13. The equilibrium computation acceleration system according to claim 7, wherein in the equilibrium computation acceleration method, in the step 2, the arbitration result of the sparsity of the weight matrix is a proportion of elements with a value of "0" in the weight matrix, and the following relationship is satisfied:

$$\Delta = \frac{N_0}{\overline{N_0} + N_0}$$

wherein, $\Delta$ represents the proportion of the elements with the value of "0" in the weight matrix, $N_0$ represents a quantity of the elements with the value of "0" in the weight matrix, and $\overline{N_0}$ represents a quantity of elements with values that are not "0" in the weight matrix.

14. The equilibrium computation acceleration system according to claim 7, wherein in the equilibrium computation acceleration method, for the idle computation submodule having operating voltage and operating frequency that match the scheduling information, the computation matrix and the weight matrix are directly input into the computation submodule; and for the idle computation submodule having operating voltage or operating frequency that does not match the scheduling information, the computation matrix and the weight matrix are input into the computation submodule, and the operating voltage or the operating frequency of the computation submodule is adjusted.

15. The equilibrium computation acceleration system according to claim 7, wherein in the equilibrium computation acceleration method, for the non-idle computation submodule having operating voltage and operating frequency that match the scheduling information, if an input queue of the computation submodule has sufficient space, the computation matrix and the weight matrix are directly input into the computation submodule;

for the non-idle computation submodule having operating voltage or operating frequency that does not match the scheduling information, if an input queue of the computation submodule has sufficient space, the computation matrix and the weight matrix are directly input into the computation submodule, and the operating voltage or the operating frequency of the computation submodule is adjusted; and for any non-idle computation submodule, if an input queue of the computation submodule has insufficient space, the computation is paused.

16. The equilibrium computation acceleration system according to claim 7, wherein in the equilibrium computation acceleration method, the step 5 specifically comprises:

step 5.1: performing the zero-hop operation, namely searching and storing a numerical value and a relative position of a non-zero element in the weight matrix; and step 5.2: performing the multiply-add operation, namely a multiplication operation and an accumulation operation.

17. The equilibrium computation acceleration system according to claim 7, wherein in the equilibrium computation acceleration method, the operating voltage and the operating frequency of the computation submodule are adjusted by: first selecting a computation submodule with an approximate operating voltage or operating frequency; and then increasing or decreasing the operating voltage of the computation module, and re-dividing the operating frequency of the computation module.

* * * * *